(12) United States Patent
Shen

(10) Patent No.: US 10,986,547 B2
(45) Date of Patent: Apr. 20, 2021

(54) CELL RESELECTION METHOD AND APPARATUS, AND FREQUENCY INFORMATION MANAGEMENT METHOD AND APPARATUS

(71) Applicant: HUAWEI TECHNOLOGIES CO., LTD., Guangdong (CN)

(72) Inventor: Li Shen, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 33 days.

(21) Appl. No.: 16/310,295

(22) PCT Filed: Jun. 16, 2016

(86) PCT No.: PCT/CN2016/086052
§ 371 (c)(1),
(2) Date: Dec. 14, 2018

(87) PCT Pub. No.: WO2017/214935
PCT Pub. Date: Dec. 21, 2017

(65) Prior Publication Data
US 2019/0335371 A1 Oct. 31, 2019

(51) Int. Cl.
*H04W 36/04* (2009.01)
*H04W 36/00* (2009.01)
(52) U.S. Cl.
CPC ........... *H04W 36/0083* (2013.01); *H04W 36/00837* (2018.08); *H04W 36/04* (2013.01)
(58) Field of Classification Search
CPC ............ H04W 80/04; H04W 36/18; H04W 36/0011; H04W 36/14; H04W 36/08
(Continued)

(56) References Cited

U.S. PATENT DOCUMENTS 9,300,551 B2 * 3/2016 Inoue ............... H04L 47/00
2010/0069070 A1 * 3/2010 Shi .................. H04W 36/32
455/436
(Continued)

FOREIGN PATENT DOCUMENTS

CN 102045686 A 5/2011
CN 103152799 A 6/2013
(Continued)

OTHER PUBLICATIONS

International Search Report and Written Opinion issued in International Application No. PCT/CN2016/086052 dated Mar. 15, 2017, 17 pages.
(Continued)

*Primary Examiner* — Peter G Solinsky
*Assistant Examiner* — Sanjay K Dewan
(74) *Attorney, Agent, or Firm* — Fish & Richardson P.C.

(57) ABSTRACT

A cell reselection method and apparatus. When a terminal starts cell reselection, the terminal queries first correspondence information according to current frequency information of the terminal. The first correspondence information is corresponding to current location information of the terminal, and includes a correspondence between search frequency information and camp-on frequency information. The terminal determines to reselect a second cell for the terminal according to the first correspondence information.

14 Claims, 8 Drawing Sheets

(58) Field of Classification Search
USPC .......................................................... 370/331
See application file for complete search history.

(56) References Cited

U.S. PATENT DOCUMENTS

| | | | |
|---|---|---|---|
| 2011/0098046 A1* | 4/2011 | Shin | H04W 48/16 455/436 |
| 2012/0263145 A1* | 10/2012 | Marinier | H04W 4/023 370/331 |
| 2013/0007039 A1* | 1/2013 | Edara | H04W 48/16 707/769 |
| 2015/0043533 A1* | 2/2015 | Kim | H04W 8/18 370/331 |
| 2015/0045023 A1* | 2/2015 | Rattner | H04W 48/16 455/434 |
| 2015/0271718 A1* | 9/2015 | Gopal | H04W 36/0094 455/436 |
| 2015/0312826 A1* | 10/2015 | Yiu | H04W 48/16 455/437 |
| 2015/0334636 A1 | 11/2015 | Maeda et al. | |
| 2015/0373603 A1* | 12/2015 | Jung | H04W 36/22 370/331 |
| 2016/0119832 A1* | 4/2016 | Nakamura | H04W 36/0061 370/331 |
| 2016/0205534 A1* | 7/2016 | Fujishiro | H04W 8/005 455/434 |
| 2016/0242112 A1 | 8/2016 | Gao et al. | |
| 2016/0269944 A1 | 9/2016 | Li | |
| 2016/0286445 A1* | 9/2016 | Jung | H04W 36/06 |
| 2017/0026879 A1 | 1/2017 | Fukuda | |

FOREIGN PATENT DOCUMENTS

| | | |
|---|---|---|
| CN | 103686880 A | 3/2014 |
| CN | 105282797 A | 1/2016 |
| CN | 105323813 A | 2/2016 |
| JP | 2012503428 A | 2/2012 |
| JP | 2014522154 A | 8/2014 |
| JP | 2016086333 A | 5/2016 |
| JP | 2017500832 A | 1/2017 |
| WO | 2014176978 A1 | 11/2014 |
| WO | 2015074271 A1 | 5/2015 |
| WO | 2015141187 A1 | 9/2015 |
| WO | 2015157925 A1 | 10/2015 |

OTHER PUBLICATIONS

Office Action issued in Japanese Application No. 2018-565735 dated Nov. 12, 2019, 16 pages (with English translation).
Office Action issued in Chinese Application No. 201680056897.7 dated Sep. 10, 2019, 22 pages (with English translation).
XP050396679 S2-095169 Orange, ATandT, "ANDSF policies conflict resolution in the UE", 3GPP TSG-SA2 Meeting #75, Kyoto, Japan, Aug. 31-Sep. 4, 2009, total 3 pages.
XP050736896 R2-134097 Nsn et al., "Way Forward for Hetnet Re-establishment Enhancements", 3GPP TSG-RAN WG2 Meeting #84, San Francisco, USA, Nov. 11-15, 2013, total 5 pages.
Extended European Search Report issued in European Application No. 16905050.7 dated Feb. 21, 2019, 15 pages.
Office Action issued in Japanese Application No. 2018-565735 dated Mar. 2, 2021, 4 pages (with English translation).

* cited by examiner

CELL RESELECTION METHOD AND APPARATUS, AND FREQUENCY INFORMATION MANAGEMENT METHOD AND APPARATUS

CROSS REFERENCE TO RELATED APPLICATIONS

This application is a national stage of International Application No. PCT/CN2016/086052, filed on Jun. 16, 2016, which is hereby incorporated by reference in its entirety.

TECHNICAL FIELD

The present invention relates to the field of communications technologies, and in particular, to a cell reselection method and apparatus, and a frequency information management method and apparatus.

BACKGROUND

With rapid development of communications technologies, a plurality of types of terminals, such as a mobile phone, a tablet computer, and a netbook have emerged, and most of the terminals may support various types of networks, such as Global System for Mobile Communications (Global System for Mobile Communications, GSM), Code Division Multiple Access (Code Division Multiple Access, CDMA), Wideband Code Division Multiple Access (Wideband Code Division Multiple Access, WCDMA), and Long Term Evolution (Long Term Evolution, LTE). In addition, the terminals may further perform network reselection between different types of networks to ensure a high-quality network service.

Currently, when a terminal wakes up in a cell of a current network and from a discontinuous reception (Discontinuous Reception, DRX) period, the terminal may set a reselection condition by using a network parameter in a system message; for example, the terminal may set a threshold to −100 dB according to signal strength in the network parameter. If signal strength of the current network is lower than −100 dB, the terminal selects, according to delivered frequency information in the system message, a frequency that can meet the threshold, and switches to the frequency. If actual frequency information is not configured in the system message, the terminal cannot find the actual frequency information in the delivered frequency information, and cannot select a radio access technology (Radio access technology, RAT) cell with a relatively high service quality. Usually, to improve a camp-on priority capability, a terminal may perform optimization processing and start a network search. That is, the terminal starts an all radio frequency (Radio Frequency, RF) capability to perform an all bandwidth search on networks that are supported by the terminal. That is, the search is performed on all frequency bands supported by the terminal, and is not limited to the delivered frequency information in the system message, so as to find frequency information that meets the threshold, and reselect a cell that is corresponding to the frequency information in the network.

However, when the optimization is started, if the actual frequency information is not configured in the system message, when the terminal starts the all RF capability to search all bandwidths of the networks, a search time is relatively long. Consequently, the terminal cannot quickly perform cell reselection, and power consumption of the terminal is relatively high.

SUMMARY

Embodiments of the present invention provide a cell reselection method and apparatus, and a frequency information management method and apparatus, so as to resolve a prior-art problem of a long network search time and large power consumption of a terminal in cell reselection.

To achieve the foregoing objective, the following technical solutions are used in the embodiments of the present invention.

According to a first aspect, a cell reselection method is provided, where the method includes: when a terminal starts cell reselection, querying, according to current frequency information of the terminal, first correspondence information corresponding to current location information of the terminal, where the first correspondence information includes a correspondence between search frequency information and camp-on frequency information; and determining, by the terminal according to the first correspondence information, to reselect a second cell for the terminal.

According to a second aspect, a cell reselection apparatus is provided, where the apparatus includes: a query unit, configured to: when the cell reselection apparatus starts cell reselection, query first correspondence information according to current frequency information of the cell reselection apparatus, where the first correspondence information is corresponding to current location information of the cell reselection apparatus, and includes a correspondence between search frequency information and camp-on frequency information; and a reselection unit, configured to determine, according to the first correspondence information, to reselect a second cell for the cell reselection apparatus.

Optionally, based on the first aspect or the second aspect, the first correspondence information is stored in the terminal, and/or in a server.

In the foregoing technical solution, the terminal queries, according to the current frequency information, the first correspondence information corresponding to the current location information of the terminal, and quickly reselects the second cell for the terminal according to the first correspondence information, so as to greatly improve a cell reselection success rate of the terminal, and reduce power consumption of the terminal.

Optionally, based on the first aspect, the determining, according to the first correspondence information, to reselect a second cell for the terminal includes: if first camp-on frequency information corresponding to the current frequency information exists in the first correspondence information, determining, by the terminal, whether the first camp-on frequency information meets a reselection condition, where the search frequency information includes the current frequency information; and if the first camp-on frequency information meets the reselection condition, reselecting a second cell corresponding to the first camp-on frequency information for the terminal.

Correspondingly and optionally, based on the first aspect, the determining, according to the first correspondence information, to reselect a second cell for the terminal includes: if no first camp-on frequency information corresponding to the current frequency information exists in the first correspondence information, performing, by the terminal, a network search to obtain second frequency information; and if the second frequency information meets a reselection condition, reselecting a second cell corresponding to the second frequency information for the terminal.

Optionally, based on the second aspect, the reselection unit is specifically configured to: if first camp-on frequency information corresponding to the current frequency information exists in the first correspondence information, determine whether the first camp-on frequency information meets a reselection condition, where the search frequency information includes the current frequency information; and if the first camp-on frequency information meets the reselection condition, reselect a second cell corresponding to the first camp-on frequency information for the cell reselection apparatus.

Correspondingly and optionally, based on the second aspect, the reselection unit is specifically configured to: if no first camp-on frequency information corresponding to the current frequency information exists in the first correspondence information, perform a network search to obtain second frequency information; and if the second frequency information meets a reselection condition, reselect a second cell corresponding to the second frequency information for the cell reselection apparatus.

In the foregoing optional technical solution, if the first camp-on frequency information exists in the first correspondence information, and the first camp-on frequency information meets the reselection condition, the terminal may directly reselect the second cell corresponding to the first camp-on frequency information. If no first camp-on frequency information exists in the first correspondence information, the network search is performed to obtain the second frequency information, and reselection is performed. This may reduce a time of the terminal in the network search, and improve a cell reselection success rate of the terminal.

Optionally, based on the first aspect, after the reselecting a second cell corresponding to the second frequency information for the terminal, the method further includes: sending a correspondence between the current frequency information of the terminal and the second frequency information, and the current location information of the terminal to the server, so that the server updates second correspondence information including first correspondence information arranged according to different location information.

Optionally, based on the second aspect, the apparatus further includes: a sending unit, configured to send a correspondence between the current frequency information of the cell reselection apparatus and the second frequency information, and the current location information of the cell reselection apparatus to the server, so that the server updates second correspondence information, where the second correspondence information includes first correspondence information arranged according to different location information.

In the foregoing optional technical solution, the server updates the second correspondence information, so that another terminal may obtain, from the server, frequency information obtained by the terminal. Further, the another terminal may quickly perform cell reselection by using the frequency information obtained by the terminal, thereby reducing a network search time.

Optionally, based on the first aspect, the method further includes: sending, by the terminal, the first correspondence information to a base station, so that the base station sends configuration information to a second terminal according to the first correspondence information.

Correspondingly and optionally, based on the first aspect, the method further includes: receiving, by the terminal, the configuration information sent by the base station; if the configuration information includes the camp-on frequency information in the first correspondence information, deleting, by the terminal, the first correspondence information; and correspondingly, the method further includes: when the terminal starts cell reselection, selecting, by the terminal, a piece of frequency information in the configuration information, and reselecting a third cell corresponding to the frequency information for the terminal.

Optionally, based on the second aspect, the sending unit is further configured to: send the first correspondence information to a base station, so that the base station sends configuration information to a second cell reselection apparatus according to the first correspondence information.

Correspondingly and optionally, based on the second aspect, the apparatus further includes: a receiving unit, configured to receive the configuration information sent by the base station, where if the configuration information includes the camp-on frequency information in the first correspondence information, the cell reselection apparatus deletes the first correspondence information; and correspondingly, the reselection unit is further configured to: when the cell reselection apparatus starts cell reselection, select a piece of frequency information in the configuration information, and reselect a third cell corresponding to the frequency information for the cell reselection apparatus.

In the foregoing optional technical solution, the terminal receives the configuration information sent by the base station, where the configuration information includes non-configured frequency information. Therefore, frequency information in the configuration information may be supplemented. Further, when performing cell reselection, the terminal may reselect the third cell according to the configuration information, so as to reduce a time of the terminal in a network search, and reduce power consumption of the terminal.

Optionally, based on the first aspect, before the querying first correspondence information according to current frequency information, the method further includes: sending, by the terminal, a frequency information obtaining request to the server, where the frequency information obtaining request includes current location information of the terminal; and receiving, by the terminal, the first correspondence information that is sent by the server and that is corresponding to the current location information.

Optionally, based on the second aspect, the sending unit is further configured to send a frequency information obtaining request to the server, where the frequency information obtaining request includes current location information of the cell reselection apparatus; and the receiving unit is further configured to receive the first correspondence information that is sent by the server and that is corresponding to the current location information.

In the foregoing optional technical solution, the terminal obtains, from the server, the first correspondence information corresponding to the current location information of the terminal, so that the terminal may quickly perform cell reselection according to historical frequency information stored in the server. Therefore, a time of the terminal in a network search is reduced.

According to a third aspect, a frequency information management method is provided, where the method includes: receiving, by a server, a frequency information obtaining request sent by a terminal, where the frequency information obtaining request includes current location information of the terminal; and sending first correspondence information corresponding to the current location information of the terminal, where the first correspondence information is stored in the server, and the first correspondence information includes a correspondence between search frequency information and camp-on frequency information.

Optionally, based on the third aspect, the method further includes: receiving, by the server, a correspondence between current frequency information of the terminal and second frequency information; and updating, by the server, second correspondence information according to the correspondence between the current frequency information of the terminal and the second frequency information, where the second correspondence information includes first correspondence information arranged according to different location information.

According to a fourth aspect, a frequency information management apparatus is provided, where the apparatus includes: a receiving unit, configured to receive a frequency information obtaining request sent by a terminal, where the frequency information obtaining request includes current location information of the terminal; and a sending unit, configured to send first correspondence information corresponding to the current location information of the terminal, where the first correspondence information is stored in the frequency information management apparatus, and the first correspondence information includes a correspondence between search frequency information and camp-on frequency information.

Optionally, based on the fourth aspect, the apparatus further includes: the receiving unit is further configured to receive a correspondence between current frequency information of the terminal and second frequency information; and an updating unit is configured to update second correspondence information according to the correspondence between the current frequency information of the terminal and the second frequency information, where the second correspondence information includes first correspondence information arranged according to different location information.

In the foregoing optional technical solution, the terminal obtains, from the server, the first correspondence information corresponding to the current location information of the terminal. The first correspondence information includes frequency information that is previously obtained by another terminal, so that the terminal may quickly perform cell reselection according to the frequency information that is previously obtained by the another terminal. Therefore, a time of the terminal in a network search is reduced.

Optionally, based on the third aspect, the method further includes: sending, by the server, the second correspondence information to a base station, so that the base station sends configuration information to the terminal according to the second correspondence information.

Optionally, based on the fourth aspect, the sending unit is further configured to: send the second correspondence information to a base station, so that the base station sends configuration information to the terminal according to the second correspondence information.

According to a fifth aspect, a frequency information management method is provided, where the method includes: receiving, by a base station, first correspondence information sent by a terminal or second correspondence information sent by a server, where the second correspondence information includes first correspondence information arranged according to different location information, and the first correspondence information is corresponding to current location information of the terminal, and includes a correspondence between search frequency information and camp-on frequency information; and sending, by the base station, configuration information to the terminal according to the first correspondence information or the second correspondence information.

According to a sixth aspect, a frequency information management apparatus is provided, where the apparatus includes: a receiving unit, configured to receive first correspondence information sent by a terminal or second correspondence information sent by a server, where the second correspondence information includes first correspondence information arranged according to different location information, and the first correspondence information is corresponding to current location information of the terminal, and includes a correspondence between search frequency information and camp-on frequency information; and a sending unit, configured to send configuration information to the terminal according to the first correspondence information or the second correspondence information.

In the foregoing optional technical solution, the terminal receives the configuration information sent by the base station, where the configuration information includes non-configured frequency information. Therefore, frequency information in the configuration information may be supplemented. Further, when performing cell reselection, the terminal may reselect the third cell according to the configuration information, so as to reduce a time of the terminal in a network search, and reduce power consumption of the terminal.

According to a seventh aspect, a terminal is provided, where the terminal includes a memory and a processor; and the memory stores code and data, and the processor runs the code in the memory, so that the terminal performs the cell reselection method according to the first aspect.

According to an eighth aspect, a server is provided, where the server includes a memory and a processor; and the memory stores code and data, and the processor runs the code in the memory, so that the server performs the frequency information management method according to the third aspect.

According to a ninth aspect, a base station is provided, where the base station includes a processor, a memory, a system bus, and a communications interface; and the memory stores code and data, the processor is connected to the memory by using the system bus, and the processor runs the code in the memory, so that the base station performs the frequency information management method according to the fifth aspect.

According to the cell reselection method and apparatus, and the frequency information management method and apparatus provided in the embodiments of the present invention, when the terminal starts cell reselection, the first correspondence information corresponding to the current location information of the terminal is queried according to the current frequency information, where the first correspondence information includes the correspondence between the search frequency information and the camp-on frequency information, so that the terminal determines, according to the first correspondence information, to reselect the second cell for the terminal. The first correspondence information includes camp-on frequency information that is obtained when the terminal or another terminal is at the current location or is near the current location. Therefore, this may greatly improve a cell reselection success rate of the terminal, reduce a time of the terminal in a network search, and further reduce power consumption of the terminal.

BRIEF DESCRIPTION OF DRAWINGS

To describe the technical solutions in the embodiments of the present invention more clearly, the following briefly describes the accompanying drawings required for describing the embodiments or the prior art. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

The following clearly and completely describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

Figure 1:
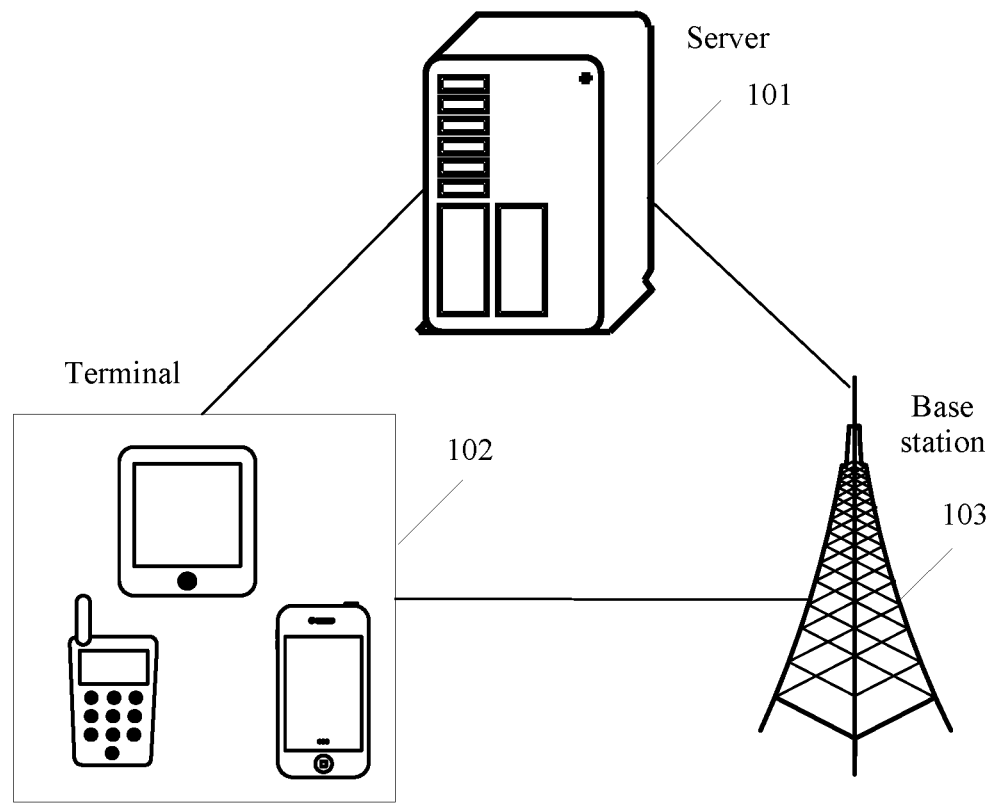
FIG. 1 is a diagram of a system architecture of a communications system according to an embodiment of the present invention.

FIG. 1 is a diagram of a network architecture of a communications system according to an embodiment of the present invention. Referring to FIG. 1, the communications system includes a server 101, at least one terminal 102, and a base station 103. The server 101, the at least one terminal 102, and the base station 103 are network devices in the communications system, and each has functions of data processing and data storage. In addition, data transmission may be performed between the server 101, the at least one terminal 102, and the base station 103.

Figure 2:
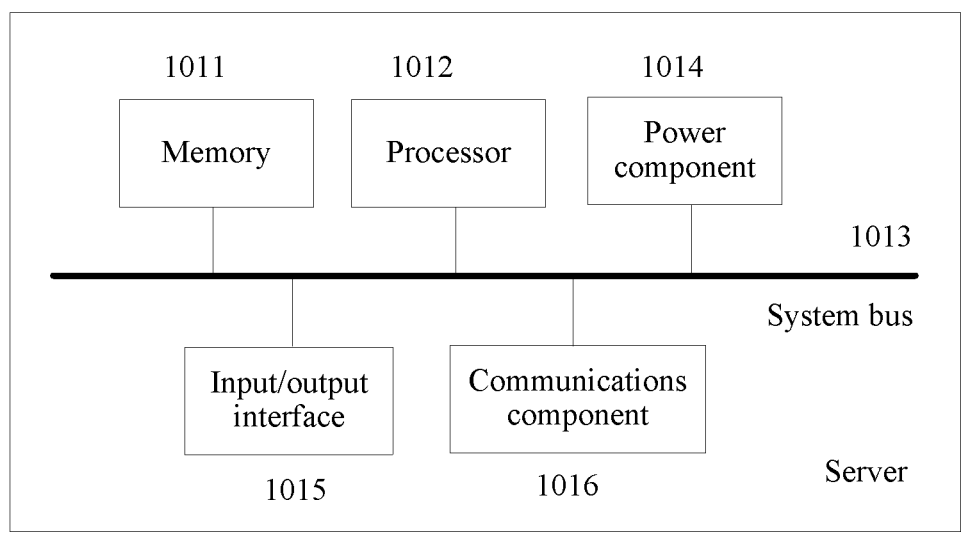
FIG. 2 is a structural diagram of hardware of a server according to an embodiment of the present invention.

The server 101 is a network device that provides a service for the at least one terminal 102. For example, the server 101 may be a computer having a server function. Referring to FIG. 2, the server 101 includes a memory 1011, a processor 1012, a system bus 1013, a power component 1014, an input/output interface 1015, a communications component 1016, and the like. The memory 1011 may be configured to store data, a software program, and a module, and mainly includes a program storage area and a data storage area. The program storage area may be used to store an operating system, an application program required for at least one function, and the like. The data storage area may be used to store data created by using the server 101, and the like. The processor 1012 performs various functions of the server 101 and processes data by running or executing the software program and/or the module stored in the memory 1011 and by invoking the data stored in the memory 1011. The system bus 1013 includes an address bus, a data bus, and a control bus, and is configured to transmit data and an instruction. The power component 1014 is configured to supply power to each component of the server 101. The input\output interface 1015 is configured to provide an interface between the processor 1012 and a peripheral interface module. The communications component 1016 is configured to perform communication between the server 101 and another device in a wired or wireless manner. In the communications system, the server 101 undertakes key tasks, such as storage, forwarding, and release of data, and is an indispensable part in a network that is based on a client/server (C/S) mode or a browser/server (B/S) mode.

Figure 3:
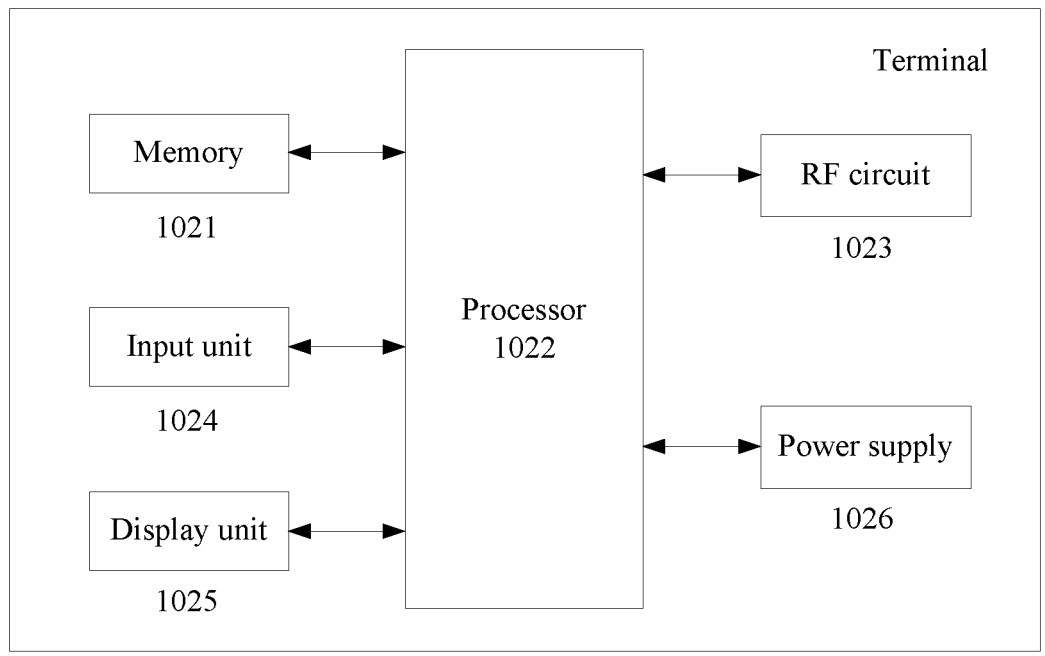
FIG. 3 is a structural diagram of hardware of a terminal according to an embodiment of the present invention.

As an object that is served in the communications system, the at least one terminal 102 may include one or more terminals. The terminal may be a mobile phone, a tablet computer, a notebook, a portable device, or the like. Referring to FIG. 3, the terminal may include components such as a memory 1021, a processor 1022, an RF (radio frequency, radio frequency) circuit 1023, an input unit 1024, a display unit 1025, and a power supply 1026. The RF circuit 1023 may be configured to send and receive signals in information sending and receiving processes or in a call process. Generally, the RF circuit 1023 includes but is not limited to an antenna, at least one amplifier, a transceiver, a coupler, a low noise amplifier (low noise amplifier, LNA), and a duplexer. In addition, the RF circuit 1023 may further communicate with a network and another device by means of radio communication. The radio communication may be based on any communications standard or protocol, including but not limited to GSM, GPRS, CDMA, WCDMA, LTE (long term evolution, Long Term Evolution), an email, and an SMS (short messaging service, short message service). Although not shown in the diagram, the terminal 102 may further include a sensor module, an audio module, a Wi-Fi (wireless fidelity, Wireless Fidelity) module, a Bluetooth module, and the like. Details are not described herein.

The base station 103 is a base station in a radio access network (Radio Access Network, RAN). The base station 103 may be a base station controller (Base Station Controller, BSC), a radio network controller (Radio Network Controller, RNC), an evolved NodeB (evolved NodeB, eNB), or the like. Referring to 4, the base station 103 includes a baseband subsystem 1031, an intermediate radio frequency subsystem 1032, an antenna feeder subsystem 1033, and some support structures 1034 (for example, an entire subsystem). The baseband subsystem 1031 is configured to implement operation and maintenance of the entire base station, implement transmission interfaces of signaling processing, radio resource management, and Packet Core Network (Evolved Packet Core, EPC), and implement an operation and maintenance main control function at a physical layer, at a MAC (Medium Access Control, Media Access Control) layer, and in L3 signaling. The intermediate radio frequency subsystem 1032 implements conversion between a baseband signal, an intermediate frequency signal, and a radio frequency signal, and implements demodulation of a received radio signal, and modulation and power amplification of a sent signal. The antenna feeder subsystem 1033 includes an antenna and a feeder that are connected to a radio frequency module of the base station, and an antenna and a feeder that are of a GRS receiving card, configured to implement receiving and transmission of a radio air interface signal. The entire subsystem 1034 is a support part of the baseband subsystem 1031 and the intermediate frequency subsystem 1032, and provides a structure and functions of power supply and environment monitoring.

Figure 4:
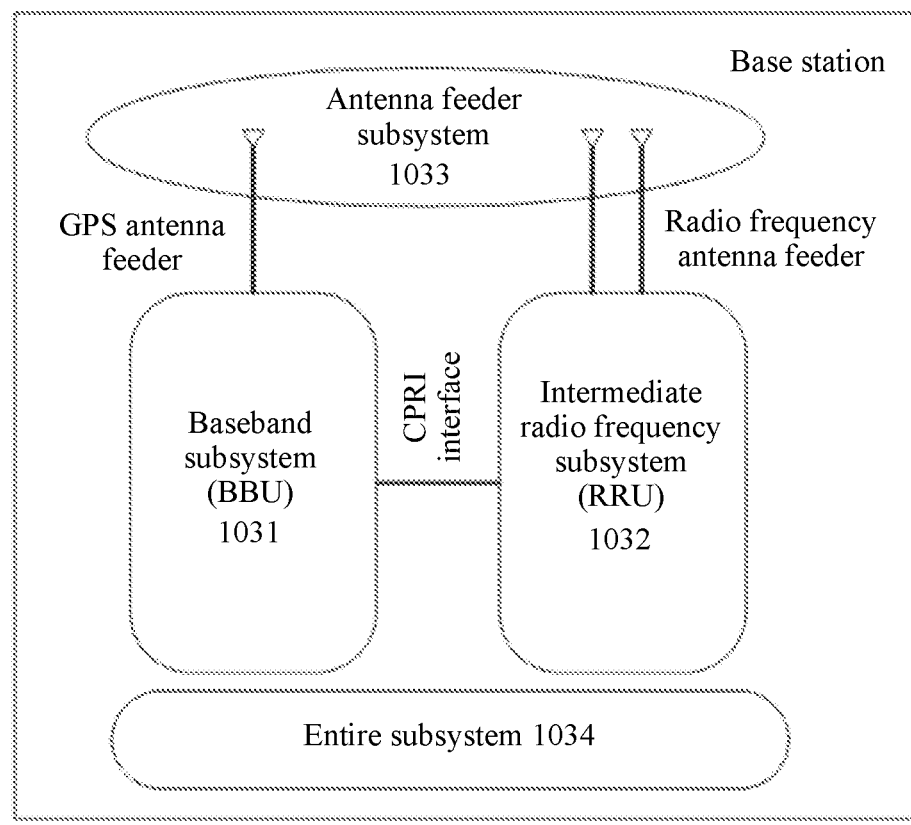
FIG. 4 is a structural diagram of hardware of a base station according to an embodiment of the present invention.

A person skilled in the art may understand that structures of a server, a terminal, and a base station shown in FIG. 2 to FIG. 4 do not constitute a limitation on the structures of the server, the terminal, and the base station. In actual application, alternatively, the server, the terminal, or the base station may include components more or fewer than those shown in the diagram, or combine some components, or have a different component arrangement.

A basic principle of the technical solution provided in the present invention is as follows: When the terminal performs network reselection measurement, if the terminal finds no appropriate frequency in frequency information included in a delivered system message, the terminal first measures pre-stored frequency information. The pre-stored frequency information is frequency information that is previously obtained when the terminal performs all bandwidth search, and/or frequency information that is previously obtained by another terminal from the server in a specified area including a current location of the terminal, so that the terminal quickly finds appropriate frequency information from the pre-stored frequency information, and reselects a network corresponding to the frequency information, so as to reduce a search time of the terminal in network reselection, and reduce power consumption of the terminal.

Figure 5:
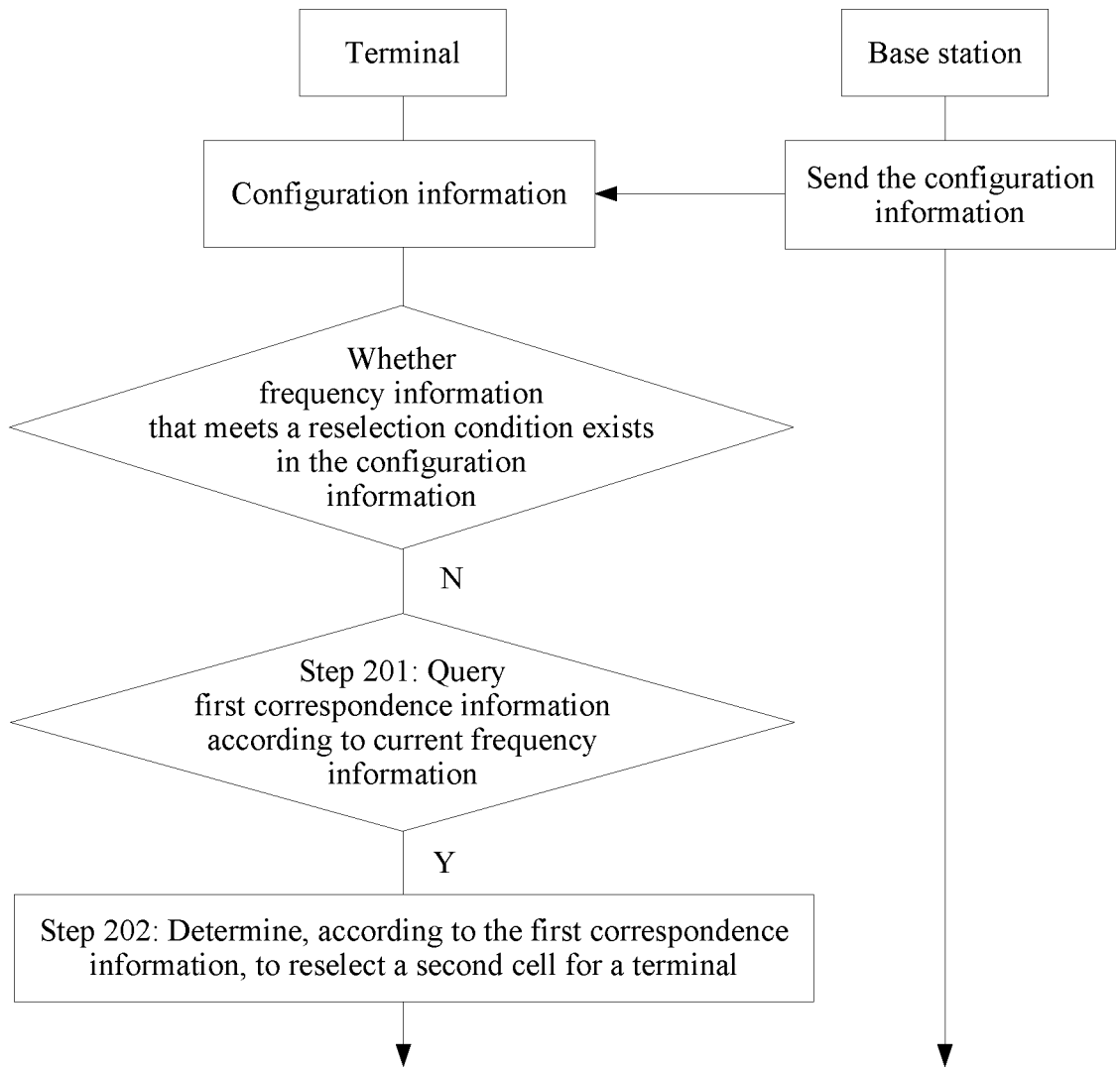
FIG. 5 is a schematic flowchart of a cell reselection method according to an embodiment of the present invention.

FIG. 5 is a schematic flowchart of a cell reselection method according to an embodiment of the present invention. Referring to FIG. 5, the method includes the following steps.

Step 201: When a terminal starts cell reselection, query first correspondence information according to current frequency information of the terminal, where the first correspondence information is corresponding to current location information of the terminal, and includes a correspondence between search frequency information and camp-on frequency information.

That the first correspondence information is corresponding to current location information of the terminal, and includes a correspondence between search frequency information and camp-on frequency information means that the first correspondence information includes a correspondence between the search frequency information and the camp-on frequency information in a specified area. The specified area is an area including a current location of the terminal. Each correspondence in correspondences that are between search frequency information and camp-on frequency information and that are included in the first correspondence information is corresponding to a piece of location information. A location indicated by the piece of location information is in the specified area, and the piece of location information may be included in the first correspondence information.

In addition, that a terminal starts cell reselection means that the terminal starts system measurement and performs a cell reselection test when a network configuration of a network cell in which the terminal is currently located meets a reselection condition. The system measurement herein includes network measurement performed when a working frequency of the terminal in a same communications system changes, and network measurement performed when working frequencies of the terminal in different communications systems change.

It should be noted that the reselection condition is a threshold set by the terminal according to a network parameter in a system message delivered by a base station. The system message may be configuration information that is sent by the base station to the terminal. The configuration information is configuration information received before the terminal performs network reselection. For example, the terminal sets, according to a network parameter, that is, signal strength, a network reselection condition to be that the signal strength is not lower than −100 dB; that is, the threshold is −100 dB. When signal strength of a network in which the terminal is currently located is lower than −100 dB, the terminal meets the network reselection condition.

Specifically, when the terminal starts the network reselection, if the terminal finds, according to a frequency priority in the configuration information, no frequency information that meets the reselection condition, the terminal queries the first correspondence information according to the current frequency information; that is, the terminal queries whether same information exists in attribute information included in the search frequency information in the first correspondence information and attribute information included in the current frequency information.

Optionally, the current frequency information, the search frequency information, and the camp-on frequency information include at least attribute information: a frequency. Further, in addition to including the attribute information: a frequency, the current frequency information, the search frequency information, and the camp-on frequency information may further respectively include at least one of the following attribute information: a network type, a location area code, or a cell identifier.

It should be noted that, that the same attribute information exists in the current frequency information and the search frequency information means that if one or more pieces of same information exist in a plurality of pieces of attribute information included in the current frequency information and the search frequency information, it represents that same attribute information exists in the current frequency information and the search frequency information.

Optionally, the first correspondence information may be stored in the terminal, or may be stored in a server, or a part of information in the first correspondence information is stored in the terminal, and the other part of information is stored in the server.

Step 202: The terminal determines, according to the first correspondence information, to reselect a second cell for the terminal.

Figure 6A:
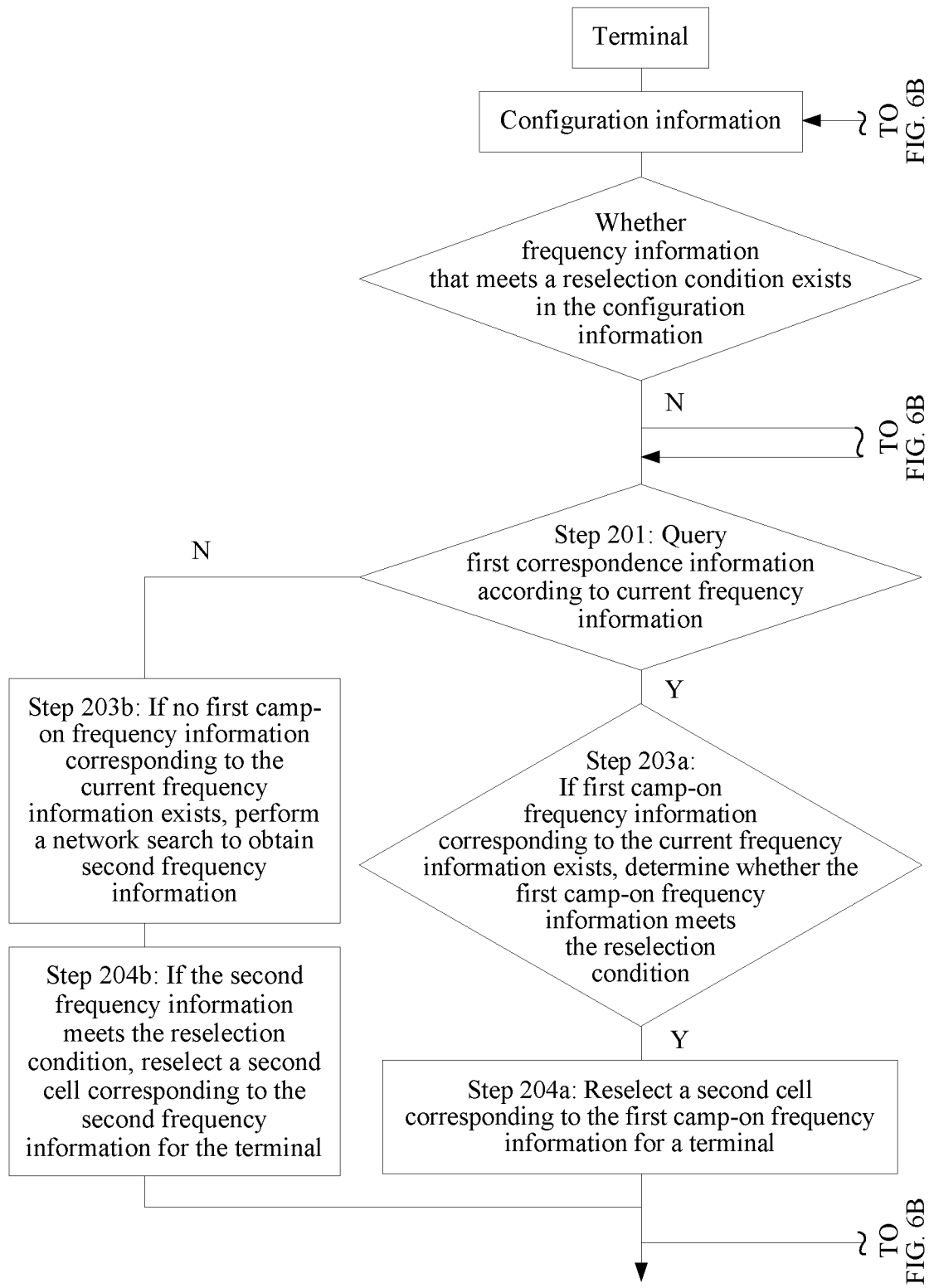
FIG. 6A and FIG. 6B are a schematic flowchart of another cell reselection method according to an embodiment of the present invention.
Figure 6B:
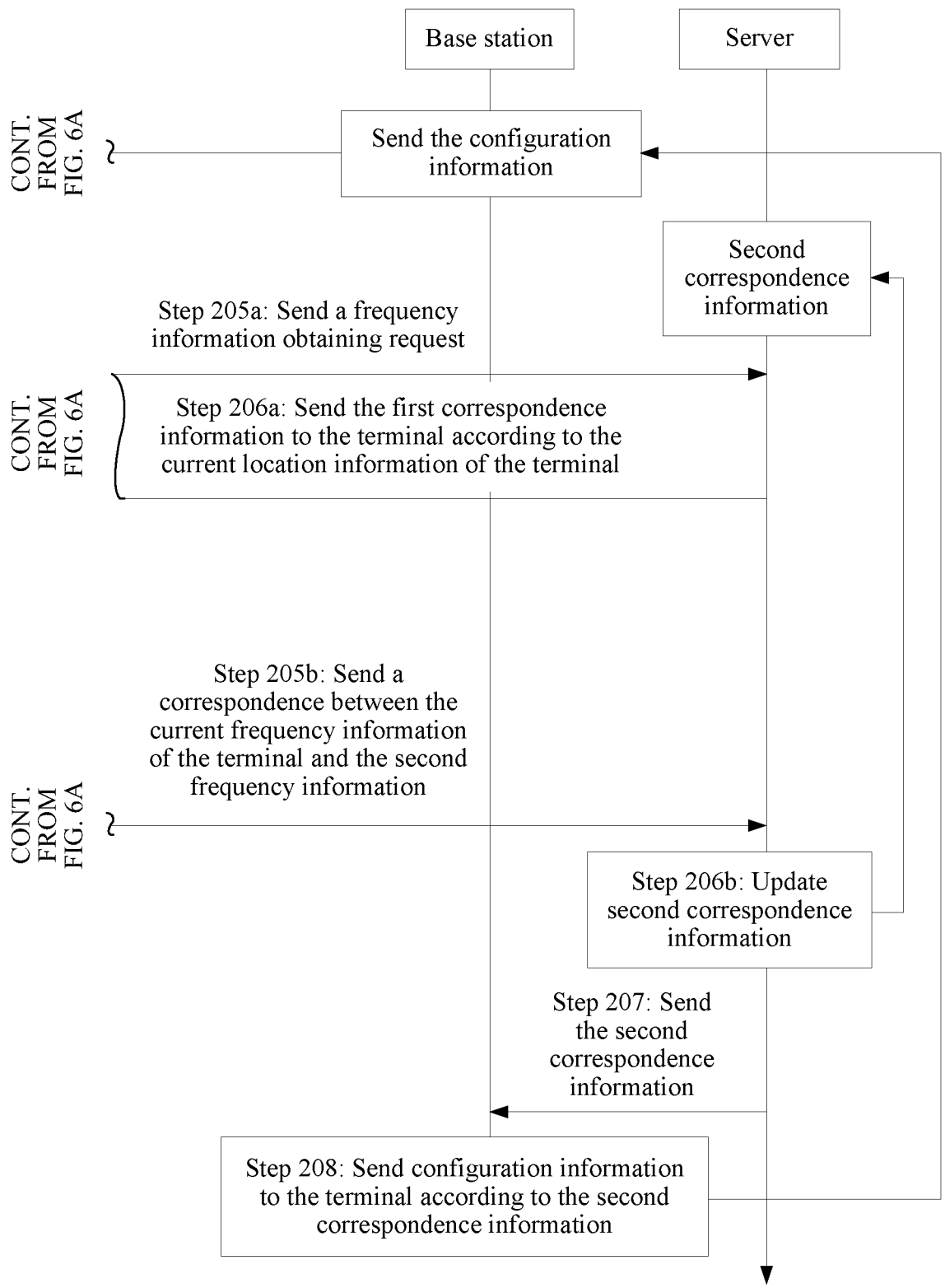

When the terminal determines, according to the first correspondence information, to reselect the second cell for the terminal, the following two cases exist according to whether first camp-on frequency information corresponding to the current frequency information exists in the first correspondence information. Referring to FIG. 6A and FIG. 6B, details are as follows:

Case 1: The first camp-on frequency information corresponding to the current frequency information exists in the first correspondence information, and the method further includes steps 203*a* to 204*a*.

Step 203*a*: If first camp-on frequency information corresponding to the current frequency information exists in the first correspondence information, the terminal determines whether the first camp-on frequency information meets a reselection condition, where the search frequency information includes the current frequency information.

That first camp-on frequency information corresponding to the current frequency information exists in the first correspondence information means that camp-on frequency information corresponding to the search frequency information in the first correspondence information is determined as the first camp-on frequency information when same information exists in attribute information of the current frequency information and attribute information of the search frequency information.

It should be noted that if same information exists in the attribute information of the current frequency information and attribute information of a plurality of pieces of search frequency information, a plurality of pieces of camp-on frequency information corresponding to the plurality of pieces of search frequency information are determined as first camp-on frequency information corresponding to the current frequency information; that is, the first camp-on frequency information includes a plurality of pieces of camp-on frequency information. Preferably, the first camp-on frequency information is sequentially measured in descending order according to a quantity of pieces of same attribute information included in the search frequency information and the current frequency information.

For example, if search frequency information that includes the same attribute information as the current frequency information includes f1, f2, and f3, and quantities of pieces of the same attribute information are respectively 2, 1, and 3, the first camp-on frequency information includes camp-on frequency information d1, d2, and d3 that are respectively corresponding to f1, f2, and f3. When performing priority measurement according to the first camp-on frequency information, the terminal performs network measurement according to a sequence of d3, d1, and d2.

Specifically, when the first camp-on frequency information corresponding to the current frequency information exists in the first correspondence information, the terminal determines whether a network parameter corresponding to the first camp-on frequency information meets the reselection condition; for example, the terminal determines whether signal strength corresponding to the first camp-on frequency information meets a threshold corresponding to the signal strength.

Step 204a: If the first camp-on frequency information meets the reselection condition, reselect a second cell corresponding to the first camp-on frequency information for the terminal.

When the network parameter corresponding to the first camp-on frequency information meets the reselection condition, the terminal may directly reselect a network corresponding to the first camp-on frequency information. That is, the terminal reselects a network type and a network cell that are indicated by the first camp-on frequency information, that is, the second cell, thereby shortening a network measurement time of the terminal, and reducing power consumption of the terminal.

Further, before step 201, the method further includes step 205a to step 207a.

Step 205a: A terminal sends a frequency information obtaining request to a server, where the frequency information obtaining request includes current location information of the terminal.

When a cell in which the terminal is currently located meets the reselection condition, the terminal may send a frequency information obtaining request including the current location information to the server, so that the server sends, according to the current location information of the terminal, a correspondence between search frequency information and camp-on frequency information in a specified area to the terminal. Certainly, the terminal may not send the frequency information obtaining request to the server. The server actively detects the current location information of the terminal, and sends the correspondence that is corresponding to the current location information of the terminal and that is between the search frequency information and the camp-on frequency information in the specified area to the terminal.

Preferably, when the location information of the terminal significantly changes, for example, the terminal moves from one cell to another cell, or moves from a location area to another location area, the terminal may send a frequency information obtaining request to the server, so that the server selects, from stored correspondences of frequency information, a correspondence of frequency information that is in a specified area and that includes a current location of the terminal. The selected correspondence of the frequency information is frequency information that is obtained when another terminal arrives at the current location of the terminal or a location near the current location of the terminal.

Step 206a: When the server receives the frequency information obtaining request sent by the terminal, the server sends, according to the current location information of the terminal, the first correspondence information corresponding to the current location information to the terminal.

The first correspondence information corresponding to the current location information includes the correspondence between the search frequency information and the camp-on frequency information in the specified area. The specified area is an area that includes the current location of the terminal. Second correspondence information includes first correspondence information arranged according to different location information.

That is, the second correspondence information includes correspondences that are reported by a plurality of terminals, that include different location information, and that are between search frequency information and camp-on frequency information. The second correspondence information is arranged according to a sequence of different location information. The first correspondence information is a part of the second correspondence information, and is corresponding to the current location information of the terminal.

It should be noted that an area size of the specified area may be set in advance, provided that the specified area includes the current location of the terminal. Optionally, the specified area may be a circular area formed by using the current location of the terminal as a center, and using a specified length as a radius; or a rectangular area formed by using the current location of the terminal as a center, and using a specified length as a length of a side. Certainly, in actual application, the specified area may be of any shape or any size. This is not limited in this embodiment of the present invention.

Further, when the terminal receives the first correspondence information sent by the server, the terminal may perform cell reselection according to the method described in step 201 to step 202. The first correspondence information includes the correspondence between the search frequency information and the camp-on frequency information in the specified area, and the correspondence is obtained when another terminal is at the current location of the terminal or is at the location near the current location. Therefore, when the terminal performs cell reselection according to the first correspondence information, a cell reselection success rate of the terminal may be greatly improved, and a time of the terminal in a network search is reduced.

Case 2: No first camp-on frequency information corresponding to the current frequency information exists in the first correspondence information, and the method further includes steps 203b to 204b.

Step 203b: If no first camp-on frequency information corresponding to the current frequency information exists in the first correspondence information, the terminal performs a network search to obtain second frequency information.

Specifically, when no first camp-on frequency information corresponding to the current frequency information exists in the first correspondence information, and when the terminal performs the network search, the terminal may select, from all bandwidths of a network according to a location at which the terminal is currently located and operator information corresponding to the terminal, a network frequency band that can be supported by the terminal. Then, the second frequency information is obtained, in a manner of network frequency search in the prior art, from the network frequency band supported by the terminal.

For example, if the location at which the terminal is currently located is China, and an operator corresponding to the terminal is China Mobile Communications Corporation, a network frequency band used by China Mobile Communications Corporation in China is selected from all the bandwidths of the network, and the second frequency information that meets the reselection condition is obtained from the network frequency band.

Step 204b: If the second frequency information meets the reselection condition, reselect a second cell corresponding to the second frequency information for the terminal.

When a network parameter corresponding to the second frequency information meets the reselection condition, the terminal may directly reselect the second cell corresponding to the second frequency information. That is, the terminal reselects a network type and a network cell that are indicated by the second frequency information. Further, the terminal may further locally store a correspondence between the current frequency information and the second frequency information, so that when the terminal arrives at the location again, the second frequency information may be quickly used for cell reselection, and a repeated network search is avoided.

Further, the method further includes step 205b and step 206b.

Step 205b: The terminal sends a correspondence between the current frequency information and the second frequency information, and the current location information of the terminal to the server.

After the terminal finds the second frequency information and reselects the second cell corresponding to the second frequency information, the terminal may send the correspondence between the current frequency information and the second frequency information, and the current location information of the terminal to the server, so that the server updates the locally stored second correspondence information. The second correspondence information includes the first correspondence information arranged according to different location information. That is, the second correspondence information includes the correspondence that is between the search frequency information and the camp-on frequency information and that is arranged according to the different location information.

It should be noted that when the correspondence between the current frequency information of the terminal and the second frequency information, and the current location information of the terminal are sent to the server, each time after a correspondence between current frequency information and the second frequency information is determined, the correspondence may be sent by the terminal to the server, or may be sent to the server according to a preset period; or the correspondence is sent to the server when the terminal searches in different locations and determines that a quantity of correspondences between current frequency information and the second frequency information reaches a preset quantity. This is not limited in this embodiment of the present invention.

Step 206b: The server receives the correspondence between the current frequency information of the terminal and the second frequency information, and the current location information of the terminal, and updates second correspondence information.

When the server receives the correspondence that is between the current frequency information and the second frequency information and that is sent by the terminal, and the current location information of the terminal, the server may add the correspondence between the current frequency information and the second frequency information to the second correspondence information according to the location information of the terminal and based on a sequence of different location information, so as to complete updating of the second correspondence information. Further, when another terminal arrives at the current location of the terminal, the another terminal may obtain, from the server, a correspondence that is between search frequency information and camp-on frequency information and that is corresponding to the current location, so that the another terminal may quickly perform cell reselection by using frequency information obtained by the terminal, thereby reducing a network search time.

It should be noted that if the correspondence between the current frequency information and the second frequency information is the same as a correspondence that is between search frequency information and camp-on frequency information and that exists in the second correspondence information, only one record of the same correspondences between the search frequency information and the camp-on frequency information is reserved in the second correspondence information.

Further, the method further includes step 207 to step 208.

Step 207: The server sends the second correspondence information to a base station.

The correspondence that is between the search frequency information and the camp-on frequency information and that is included in the second correspondence information is frequency information reselected by means of network search when a plurality of terminals perform cell reselection according to configuration information, and cannot obtain appropriate frequency information. Therefore, the server may send the second correspondence information to the base station, so that the base station re-determines and sends configuration information according to the second correspondence information, so as to deliver the frequency information obtained by the plurality of terminals to each terminal.

In addition, when the server sends the second correspondence information to the base station, the server may send the second correspondence information to the base station according to a specified period, or may send the second correspondence information to the base station when a quantity of correspondences that are included in the second correspondence information reaches a specified quantity. Certainly, in actual application, the server may alternatively send the second correspondence information to the base station in another manner. This is not limited in this embodiment of the present invention.

Further, after the server sends the second correspondence information to the base station, the server may further delete second correspondence information stored in the server, so as to save storage space.

Step 208: When receiving the second correspondence information, the base station sends configuration information to a second terminal according to the second correspondence information.

Optionally, the configuration information includes non-configured frequency information, and the non-configured frequency information is frequency information that the base station does not configure for the terminal in last configuration information.

When the base station receives the second correspondence information, the base station selects, according to the camp-on frequency information in the second correspondence information, frequency information that is not configured for the terminal in last configuration information, then determines non-configured frequency information, and sends the non-configured frequency information to the second terminal by sending configuration information again, so as to supplement frequency information in configuration information. The second terminal may be any terminal communicating with the base station, and alternatively, the second terminal may be the terminal.

Further, when the terminal receives the configuration information, if the non-configured frequency information includes the camp-on frequency information in the first correspondence information, the terminal deletes the first correspondence information.

Specifically, when the terminal receives the configuration information, the terminal may compare the non-configured frequency information included in the configuration information with the camp-on frequency information in the first correspondence information stored in the terminal. If the non-configured frequency information includes all camp-on frequency information in the first correspondence information, the terminal may delete the first correspondence information stored in the terminal; or if the non-configured frequency information includes a part of camp-on frequency information in the first correspondence information, the terminal may delete a whole piece of correspondence corresponding to the part of camp-on frequency information in the first correspondence information, so as to reduce storage in the terminal and save memory.

Further, when the terminal performs cell reselection again, the terminal may directly select one piece of frequency information from the frequency information included in the configuration information. When the selected frequency information meets the reselection condition, the terminal reselects a third cell corresponding to the selected frequency information.

Optionally, the terminal may alternatively send the first correspondence information to the base station, so that the base station sends the configuration information to the second terminal according to the first correspondence information. A process in which the terminal sends the first correspondence information to the base station, and the base station sends the configuration information to the second terminal according to the first correspondence information is similar to a process in which the foregoing server sends the second correspondence information to the base station, and the base station sends the configuration information to the second terminal according to the second correspondence information. Details are not described in this embodiment of the present invention again.

According to the cell reselection method provided in this embodiment of the present invention, when the terminal starts cell reselection, the first correspondence information is queried according to the current frequency information. If the first camp-on frequency information corresponding to the current frequency information exists in the first correspondence information, and the first camp-on frequency information meets the reselection condition, the terminal reselects the network corresponding to the first camp-on frequency information. The first correspondence information includes camp-on frequency information that is obtained when the terminal or another terminal is at the current location or is near the current location. Therefore, this may greatly improve a cell reselection success rate of the terminal, reduce a time of the terminal in a network search, and further reduce power consumption of the terminal.

Figure 7:
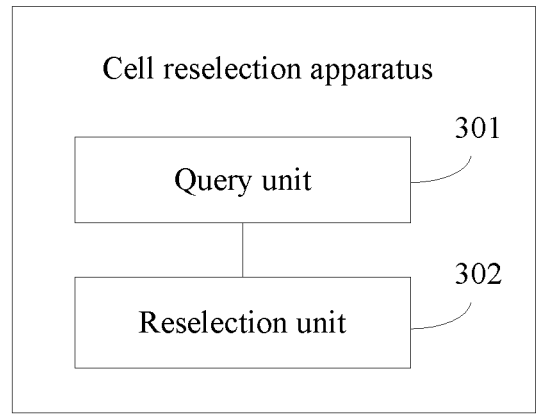
FIG. 7 is a schematic structural diagram of a cell reselection apparatus according to an embodiment of the present invention.

FIG. 7 is a schematic structural diagram of a cell reselection apparatus according to an embodiment of the present invention. Referring to FIG. 7, the apparatus includes a query unit 301 and a reselection unit 302.

The query unit 301 is configured to: when the cell reselection apparatus starts cell reselection, query first correspondence information according to current frequency information of the cell reselection apparatus, where the first correspondence information is corresponding to current location information of the cell reselection apparatus, and includes a correspondence between search frequency information and camp-on frequency information.

The reselection unit 302 is configured to determine, according to the first correspondence information, to reselect a second cell for the cell reselection apparatus.

Optionally, the first correspondence information is stored in the cell reselection apparatus, and/or in a server.

In another embodiment of the present invention, the reselection unit 302 is specifically configured to: if first camp-on frequency information corresponding to the current frequency information exists in the first correspondence information, determine whether the first camp-on frequency information meets a reselection condition, where the search frequency information includes the current frequency information; and if the first camp-on frequency information meets the reselection condition, reselect a second cell corresponding to the first camp-on frequency information for the cell reselection apparatus.

In another embodiment of the present invention, the reselection unit 302 is specifically configured to: if no first camp-on frequency information corresponding to the current frequency information exists in the first correspondence information, perform a network search to obtain second frequency information; and if the second frequency information meets a reselection condition, reselect a second cell corresponding to the second frequency information for the cell reselection apparatus.

Figure 8:
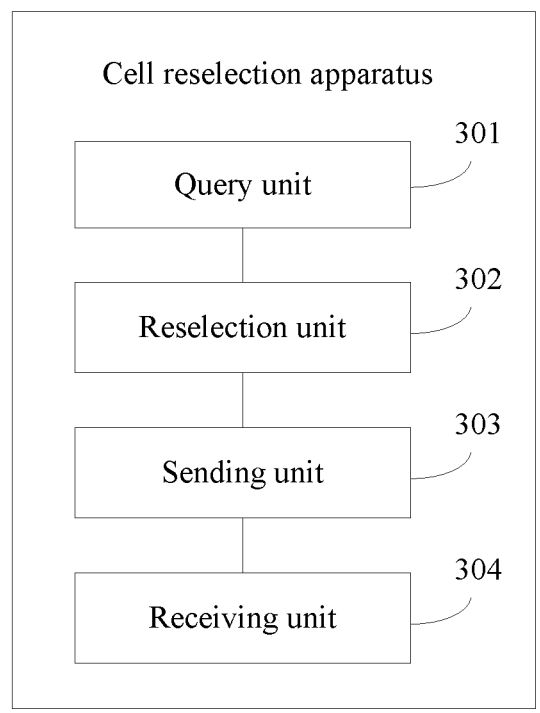
FIG. 8 is a schematic structural diagram of another cell reselection apparatus according to an embodiment of the present invention.

Optionally, referring to FIG. 8, the apparatus further includes a sending unit 303 and a receiving unit 304.

The sending unit 303 is configured to send a correspondence between the current frequency information of the cell reselection apparatus and the second frequency information, and the current location information of the cell reselection apparatus to the server, so that the server updates second correspondence information, where the second correspondence information includes first correspondence information arranged according to different location information.

Optionally, the sending unit 303 is further configured to send the first correspondence information to a base station, so that the base station sends configuration information to a second cell reselection apparatus according to the first correspondence information.

In another embodiment of the present invention, the receiving unit 304 is configured to receive the configuration information sent by the base station, where if the configuration information includes the camp-on frequency information in the first correspondence information, the cell reselection apparatus deletes the first correspondence information.

Correspondingly, the reselection unit 302 is further configured to: when the cell reselection apparatus starts cell reselection, select a piece of frequency information in the configuration information, and reselect a third cell corresponding to the frequency information for the cell reselection apparatus.

In another embodiment of the present invention, the sending unit 303 is further configured to send a frequency information obtaining request to the server, where the frequency information obtaining request includes current location information of the cell reselection apparatus; and the receiving unit 304 is further configured to receive the first correspondence information that is sent by the server and that is corresponding to the current location information.

According to the cell reselection apparatus provided in this embodiment of the present invention, when the cell reselection apparatus starts cell reselection, the first correspondence information corresponding to the current location information of the terminal is queried according to the current frequency information, where the first correspondence information includes the correspondence between the search frequency information and the camp-on frequency information, so as to determine, according to the first correspondence information, to reselect the second cell for the cell reselection apparatus. The first correspondence information includes camp-on frequency information that is obtained when the cell reselection apparatus or another cell reselection apparatus is at the current location or is near the current location. Therefore, this may greatly reduce a time of the cell reselection apparatus in a network search, and further reduce power consumption of the cell reselection apparatus.

Figure 9:
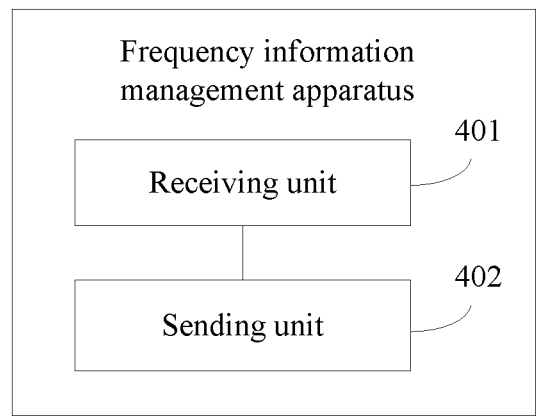
FIG. 9 is a schematic structural diagram of a frequency information management apparatus according to an embodiment of the present invention.

FIG. 9 is a schematic structural diagram of a frequency information management apparatus according to an embodiment of the present invention. The apparatus includes a receiving unit 401 and a sending unit 402.

The receiving unit 401 is configured to receive a frequency information obtaining request sent by a terminal, where the frequency information obtaining request includes current location information of the terminal.

The sending unit 402 is configured to send first correspondence information corresponding to the current location information of the terminal, where the first correspondence information is stored in the frequency information management apparatus, and the first correspondence information includes a correspondence between search frequency information and camp-on frequency information.

Figure 10:
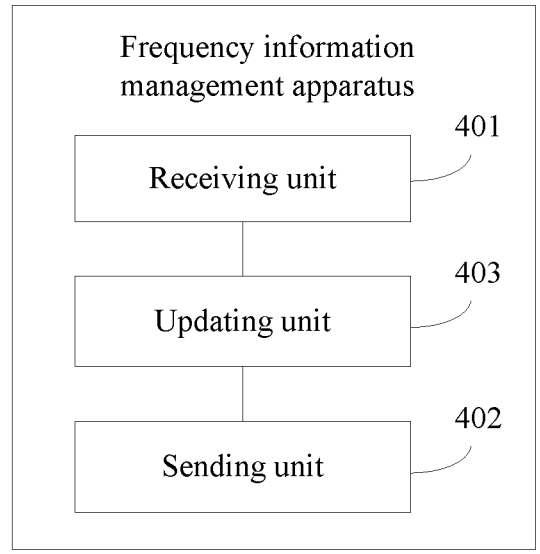
FIG. 10 is a schematic structural diagram of another frequency information management apparatus according to an embodiment of the present invention.

Optionally, referring to FIG. 10, the apparatus further includes an updating unit 403.

The receiving unit 401 is further configured to receive a correspondence between current frequency information of the terminal and second frequency information.

The updating unit 403 is configured to update second correspondence information according to the correspondence between the current frequency information of the terminal and the second frequency information, where the second correspondence information includes first correspondence information arranged according to different location information.

In another embodiment of the present invention, the sending unit 402 is further configured to send the second correspondence information to a base station, so that the base station sends configuration information to the terminal according to the second correspondence information.

According to the frequency information management apparatus provided in this embodiment of the present invention, the frequency information obtaining request sent by the terminal is received, and the first correspondence information corresponding to the current location information of the terminal is sent to the terminal, where the first correspondence information includes frequency information that is previously obtained by another terminal, so that the terminal may quickly perform cell reselection according to the frequency information that is previously obtained by the another terminal. Therefore, a time of the terminal in a network search is reduced.

Figure 11:
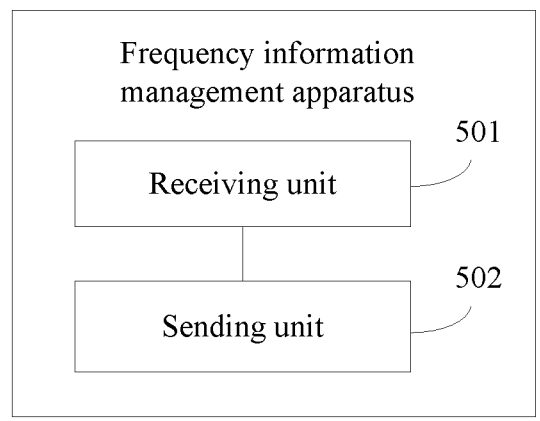
FIG. 11 is a schematic structural diagram of a frequency information management apparatus according to an embodiment of the present invention.

FIG. 11 is a schematic structural diagram of a frequency information management apparatus according to an embodiment of the present invention. The apparatus includes a receiving unit 501 and a sending unit 502.

The receiving unit 501 is configured to receive first correspondence information sent by a terminal or second correspondence information sent by a server, where the second correspondence information includes first correspondence information arranged according to different location information, and the first correspondence information is corresponding to current location information of the terminal, and includes a correspondence between search frequency information and camp-on frequency information.

The sending unit 502 is configured to send configuration information to the terminal according to the first correspondence information or the second correspondence information.

According to the frequency information management apparatus provided in this embodiment of the present invention, the first correspondence information sent by the terminal is received, or the second correspondence information sent by the server is received, and the configuration information is sent to the terminal according to the first correspondence information or the second correspondence information, so that frequency information in the configuration information may be supplemented. Further, when the terminal performs cell reselection, cell reselection may be performed according to the configuration information, so as to reduce a time of the terminal in a network search, and reduce power consumption of the terminal.

An embodiment of the present invention provides a terminal. Referring to FIG. 3, the terminal includes a memory 1021, a processor 1022, an RF (radio frequency, radio frequency) circuit 1023, an input unit 1024, a display unit 1025, a power supply 1026, and the like. The memory 1021 stores code and data, and the processor 1022 runs the code in the memory 1021, so that a server performs steps of the terminal in the cell reselection method according to the embodiment corresponding to the foregoing FIG. 5 or FIG. 6A and FIG. 6B.

According to the terminal provided in this embodiment of the present invention, when the terminal starts cell reselection, the first correspondence information is queried according to the current frequency information. If the first camp-on frequency information corresponding to the current frequency information exists in the first correspondence information, and the first camp-on frequency information meets the reselection condition, the terminal reselects the network corresponding to the first camp-on frequency information. The first correspondence information includes camp-on frequency information that is obtained when the terminal or another terminal is at the current location or is near the current location. Therefore, this may greatly improve a cell reselection success rate of the terminal, reduce a time of the terminal in a network search, and further reduce power consumption of the terminal.

An embodiment of the present invention provides a server. Referring to FIG. 2, the server includes a memory 1011, a processor 1012, a system bus 1013, a power component 1014, an input/output interface 1015, a communications component 1016, and the like. The memory 1011 stores code and data, and the processor 1012 runs the code in the memory 1011, so that the server performs steps of the server in the cell reselection method according to the embodiment corresponding to the foregoing FIG. 5 or FIG. 6A and FIG. 6B.

According to the server provided in this embodiment of the present invention, the frequency information obtaining request sent by the terminal is received, and the first correspondence information corresponding to the current location information of the terminal is sent to the terminal, where the first correspondence information includes frequency information that is previously obtained by another terminal, so that the terminal may quickly perform cell reselection according to the frequency information that is previously obtained by the another terminal. Therefore, a time of the terminal in a network search is reduced.

Figure 12:
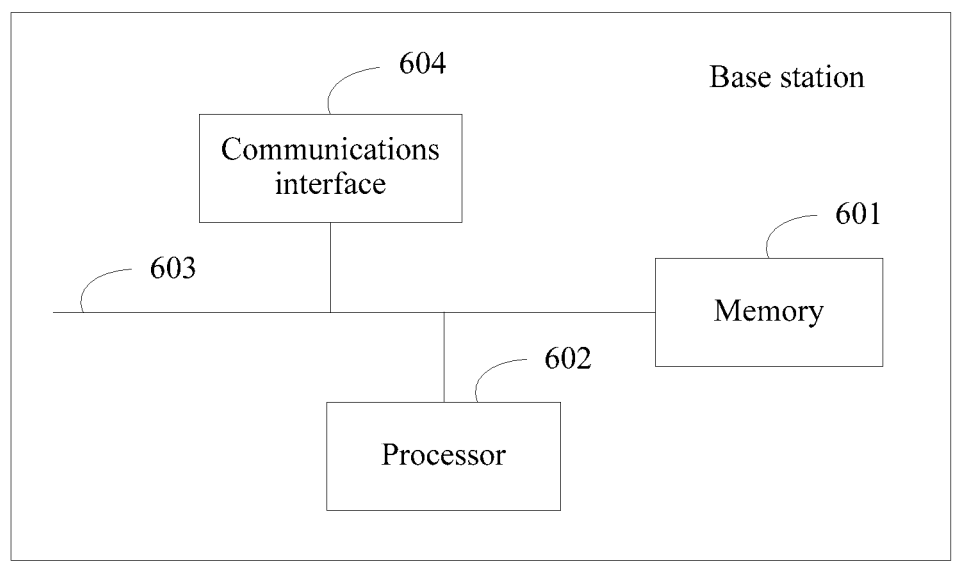
FIG. 12 is a schematic structural diagram of a base station according to an embodiment of the present invention.

FIG. 12 is a schematic structural diagram of a base station according to an embodiment of the present invention. Referring to FIG. 12, the base station includes a memory 601, a processor 602, a system bus 603, and a communications interface 604. The memory 601 stores code and data, the processor 602 is connected to the memory 601 by using the system bus 603, and the processor 602 runs the code in the memory 601, so that the base station performs steps of the base station in the cell reselection method according to the embodiment corresponding to the foregoing FIG. 5 or FIG. 6A and FIG. 6B.

According to the base station provided in this embodiment of the present invention, the first correspondence information sent by the terminal is received, or the second correspondence information sent by the server is received, and the configuration information is sent to the terminal according to the first correspondence information or the second correspondence information, so that frequency information in the configuration information may be supplemented. Further, when the terminal performs cell reselection, cell reselection may be performed according to the configuration information, so as to reduce a time of the terminal in a network search, and reduce power consumption of the terminal.

Finally, it should be noted that the foregoing embodiments are merely intended for describing the technical solutions of the present invention but not for limiting the present invention. Although the present invention is described in detail with reference to the foregoing embodiments, a person of ordinary skill in the art should understand that they may still make modifications to the technical solutions described in the foregoing embodiments or make equivalent replacements to some technical features thereof, without departing from the spirit and scope of the technical solutions of the embodiments of the present invention.

What is claimed is:

1. A cell reselection method, wherein the method comprises:
    sending, by a terminal, a frequency information obtaining request to a server, wherein the frequency information obtaining request comprises current location information of the terminal;
    receiving, by the terminal and in response to the frequency information obtaining request, first correspondence information that is sent by the server and that is corresponding to the current location information, wherein the first correspondence information comprises a correspondence between search frequency information and camp-on frequency information, and the first correspondence information is obtained by the server based on frequency information sent by a different terminal;
    when the terminal starts cell reselection, querying the first correspondence information according to current frequency information of the terminal, wherein the first correspondence information is corresponding to current location information of the terminal; and
    determining, by the terminal according to the first correspondence information, to reselect a second cell for the terminal.

2. The method according to claim 1, wherein the determining, according to the first correspondence information, to reselect a second cell for the terminal comprises:
    determining, by the terminal, whether first camp-on frequency information meets a reselection condition if the first camp-on frequency information corresponding to the current frequency information exists in the first correspondence information, wherein the search frequency information comprises the current frequency information; and
    reselecting, by the terminal, a second cell corresponding to the first camp-on frequency information for the terminal if the first camp-on frequency information meets the reselection condition.

3. The method according to claim 1, wherein the determining, according to the first correspondence information, to reselect a second cell for the terminal comprises:
    performing, by the terminal, a network search to obtain second frequency information if no first camp-on frequency information corresponding to the current frequency information exists in the first correspondence information; and
    reselecting a second cell corresponding to the second frequency information for the terminal if the second frequency information meets a reselection condition.

4. The method according to claim 3, wherein after the reselecting a second cell corresponding to the second frequency information for the terminal, the method further comprises:
    sending, to a server, a correspondence between the current frequency information of the terminal and the second frequency information, and the current location information of the terminal.

5. The method according to claim 1, wherein the method further comprises:
    receiving, by the terminal, configuration information sent by a base station;
    deleting, by the terminal, the first correspondence information if the configuration information comprises the camp-on frequency information in the first correspondence information; and selecting, by the terminal, a piece of frequency information in the configuration information, and reselecting a third cell corresponding to the frequency information for the terminal when the terminal starts cell reselection.

6. A frequency information management method, wherein the method comprises:
receiving, by a server, a frequency information obtaining request sent by a terminal, wherein the frequency information obtaining request comprises current location information of the terminal; and
sending, by the server and in response to the frequency information obtaining request, first correspondence information corresponding to the current location information of the terminal, wherein the first correspondence information is stored in the server, the first correspondence information comprises a correspondence between search frequency information and camp-on frequency information, and the first correspondence information is obtained by the server based on frequency information sent by a different terminal.

7. The method according to claim 6, wherein the method further comprises:
receiving, by the server, a correspondence between current frequency information of the terminal and second frequency information; and
updating, by the server, second correspondence information according to the correspondence between the current frequency information of the terminal and the second frequency information, wherein the second correspondence information comprises the first correspondence information arranged according to different location information.

8. The method according to claim 6, wherein the method further comprises:
sending, by the server, second correspondence information to a base station.

9. A terminal, wherein the terminal comprises a memory and a processor, the memory stores code and data, and the processor executes the code in the memory to cause the terminal to perform following operations:
sending, by the terminal, a frequency information obtaining request to a server, wherein the frequency information obtaining request comprises current location information of the terminal;
receiving, by the terminal and in response to the frequency information obtaining request, first correspondence information that is sent by the server and that is corresponding to the current location information, wherein the first correspondence information comprises a correspondence between search frequency information and camp-on frequency information, and the first correspondence information is obtained by the server based on frequency information sent by a different terminal;

when the terminal starts cell reselection, querying the first correspondence information according to current frequency information of the terminal, wherein the first correspondence information is corresponding to current location information of the terminal; and
determining, according to the first correspondence information, to reselect a second cell for the terminal.

10. The terminal according to claim 9, wherein the determining, according to the first correspondence information, to reselect a second cell for the terminal comprises:
determining whether first camp-on frequency information meets a reselection condition if the first camp-on frequency information corresponding to the current frequency information exists in the first correspondence information, wherein the search frequency information comprises the current frequency information; and
reselecting a second cell corresponding to the first camp-on frequency information for the terminal if the first camp-on frequency information meets the reselection condition.

11. The terminal according to claim 9, wherein the determining, according to the first correspondence information, to reselect a second cell for the terminal comprises:
performing a network search to obtain second frequency information if no first camp-on frequency information corresponding to the current frequency information exists in the first correspondence information; and
reselecting a second cell corresponding to the second frequency information for the terminal if the second frequency information meets a reselection condition.

12. The terminal according to claim 11, wherein after the reselecting a second cell corresponding to the second frequency information for the terminal, the operations further comprise:
sending, to a server, a correspondence between the current frequency information of the terminal and the second frequency information, and the current location information of the terminal to the server.

13. The terminal according to claim 9, wherein the operations further comprise:
sending the first correspondence information to a base station.

14. The terminal according to claim 9, wherein the operations further comprise:
receiving configuration information sent by a base station;
deleting the first correspondence information if the configuration information comprises the camp-on frequency information in the first correspondence information; and
selecting a piece of frequency information in the configuration information, and reselecting a third cell corresponding to the frequency information for the terminal when the terminal starts cell reselection.

* * * * *